United States Patent
Nowak et al.

(10) Patent No.: US 8,098,795 B2
(45) Date of Patent: Jan. 17, 2012

(54) DEVICE AND METHOD FOR TIME-DELAYED INTEGRATION ON AN X-RAY DETECTOR COMPOSED OF A PLURALITY OF DETECTOR MODULES

(75) Inventors: Tristan Nowak, Erlangen (DE); Willi A. Kalender, Möhrendorf (DE); Harry Schilling, Eichstätt (DE)

(73) Assignee: Friedrich-Alexander-Universität Erlangen-Nürnberg, Erlangen (DE)

( * ) Notice: Subject to any disclaimer, the term of this patent is extended or adjusted under 35 U.S.C. 154(b) by 155 days.

(21) Appl. No.: 12/569,376

(22) Filed: Sep. 29, 2009

(65) Prior Publication Data

US 2010/0150305 A1 Jun. 17, 2010

(51) Int. Cl.
*H05G 1/64* (2006.01)

(52) U.S. Cl. .......................... 378/98.8; 378/62

(58) Field of Classification Search .............. 378/19, 378/98.8, 62, 98.12; 348/295
See application file for complete search history.

(56) References Cited

U.S. PATENT DOCUMENTS

| | | |
|---|---|---|
| 4,709,382 A | 11/1987 | Sones |
| 5,528,043 A | 6/1996 | Spivey et al. |
| 5,744,806 A | 4/1998 | Frojd |
| 5,828,408 A | 10/1998 | Mottin et al. |
| 5,991,357 A | 11/1999 | Marcovici et al. |
| 6,242,743 B1 | 6/2001 | DeVito et al. |
| 6,325,537 B1 | 12/2001 | Watanabe |
| 6,415,012 B1 | 7/2002 | Taguchi et al. |
| 6,463,122 B1 | 10/2002 | Moore |
| 6,819,736 B1 | 11/2004 | Bruder et al. |
| 6,847,040 B2 * | 1/2005 | Strommer ............... 250/370.09 |
| 6,921,200 B1 * | 7/2005 | Booysen et al. ............ 378/205 |
| 7,453,978 B1 | 11/2008 | DiBianca et al. |
| 7,634,061 B1 * | 12/2009 | Tumer et al. ............... 378/98.9 |
| 2004/0017224 A1 | 1/2004 | Tumer et al. |
| 2004/0066880 A1 | 4/2004 | Oikawa |
| 2004/0251419 A1 | 12/2004 | Nelson et al. |
| 2008/0135765 A1 | 6/2008 | Vydrin |

FOREIGN PATENT DOCUMENTS

DE 19812995 10/1999

* cited by examiner

*Primary Examiner* — Jurie Yun
(74) *Attorney, Agent, or Firm* — Meyertons, Hood, Kivlin, Kowert & Goetzel, P.C.; Eric B. Meyertons

(57) ABSTRACT

An X-ray detector for recording an image of an object that is moving relative to the detector includes a plurality of detector modules which are adjacently disposed so that they partially overlap. Using the detector modules, a TDI (Time Delayed Integration) is performed within each detector module. Subsequently an evaluation unit determines corrected measurement values of an overlap region by adding the measured values from the individual detector modules in the overlap region.

8 Claims, 6 Drawing Sheets

DEVICE AND METHOD FOR TIME-DELAYED INTEGRATION ON AN X-RAY DETECTOR COMPOSED OF A PLURALITY OF DETECTOR MODULES

PRIORITY CLAIM

This application claims priority from German Patent Application No. 10 2008 042 430.7 filed on Sep. 29, 2008 (now abandoned), pending European Patent Application No. 09 154 848.7 filed on Mar. 11, 2009, and pending German Patent Application No. 10 2009 028 183.5 filed on Aug. 3, 2009.

BACKGROUND OF THE INVENTION

1. Field of the Invention

The invention relates to an X-ray scanner, in particular a computer-tomographic imaging system, a detector for a system of this kind, and also a method for evaluating signals from the detector.

2. Description of the Relevant Art

U.S. Pat. No. 5,828,408 discloses an X-ray detector which is read-out utilizing TDI (Time Delayed Integration). Thereby a longer time of integration and thus an increased signal/noise ratio can be achieved with movable objects. In this, the image information is shifted synchronously with movement in the pixel cells. One single sensor is limited to one chip at a time.

U.S. Pat. No. 5,744,806 discloses a method for disposing a plurality of sensor chips in order to obtain larger sensors. Here the sensors are disposed obliquely to the direction of movement, with the information loss of the surface between the sensors being compensated by image processing.

US 2004/0017224 A1 discloses a detector arrangement, where Time-delayed integration is effected in an ASIC directly connected to the detector.

The technology here represented involves relatively high outlay, and is described as being applied preferably for space missions.

SUMMARY OF THE INVENTION

The embodiments are based on the object of providing an X-ray scanner, a detector, and also a method for operating the detector, where the method of time delayed integration can be performed on a large detector surface which includes a plurality of detector modules.

In an embodiment, an X-ray detector for recording an image of a object moving relative to the detector includes at least two detector modules for detecting individual pixel values, which detector modules are disposed adjacently so that they partially overlap to form an overlap region, with the detector modules being adapted to perform a TDI (Time Delayed Integration) for which they shift pixel values along a direction of movement of the object in correspondence with a movement of the object with respect to the detector, wherein an evaluation unit is connected to the detector modules for determining corrected pixel values in the overlap region from pixel values detected by the detector modules.

In an embodiment an X-ray scanner includes an X-ray detector of the kind described above.

Furthermore, a method of operating an X-ray detector including at least two adjacently disposed, partially overlapping detector modules (10, 11, 12) for recording an image of an object that is moving relative to the detector, includes a) performing a TDI (Time Delayed Integration) with a given number of integration steps;
b) determining pixel values of a region of overlapping by weighted addition of pixel values of a region of overlapping of the overlapping detector modules.

BRIEF DESCRIPTION OF THE DRAWINGS

In the following, the invention will be described by way of example, without limitation of the general inventive concept, on examples of embodiment and with reference to the drawings.

Figure 1:
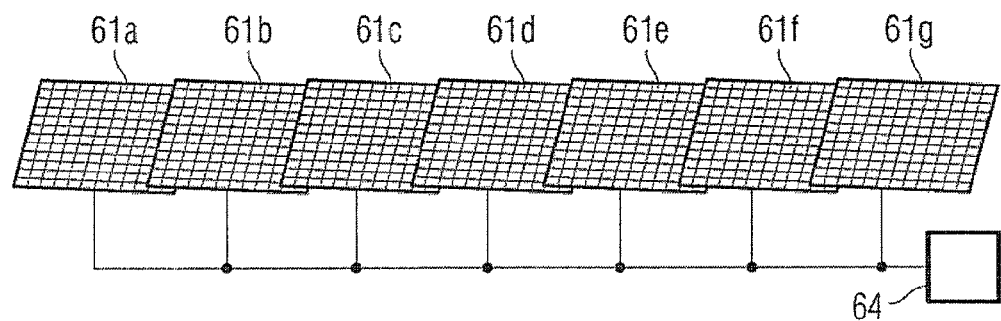
FIG. 1 shows a device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows a detector in accordance with the invention, including a plurality of detector modules 61a to 61g disposed to overlap. An evaluation of signals is effected by means of time-delayed integration. The time-delayed integration (TDI) is a technique for reducing blurring caused by movement with digitally recorded images, i.e. with pixeled detectors, which technique can be implemented in an especially preferred manner with X-ray detectors. In accordance with an embodiment, an evaluation of signals from the individual detector modules is effected with an evaluation unit 64.

Figure 2:
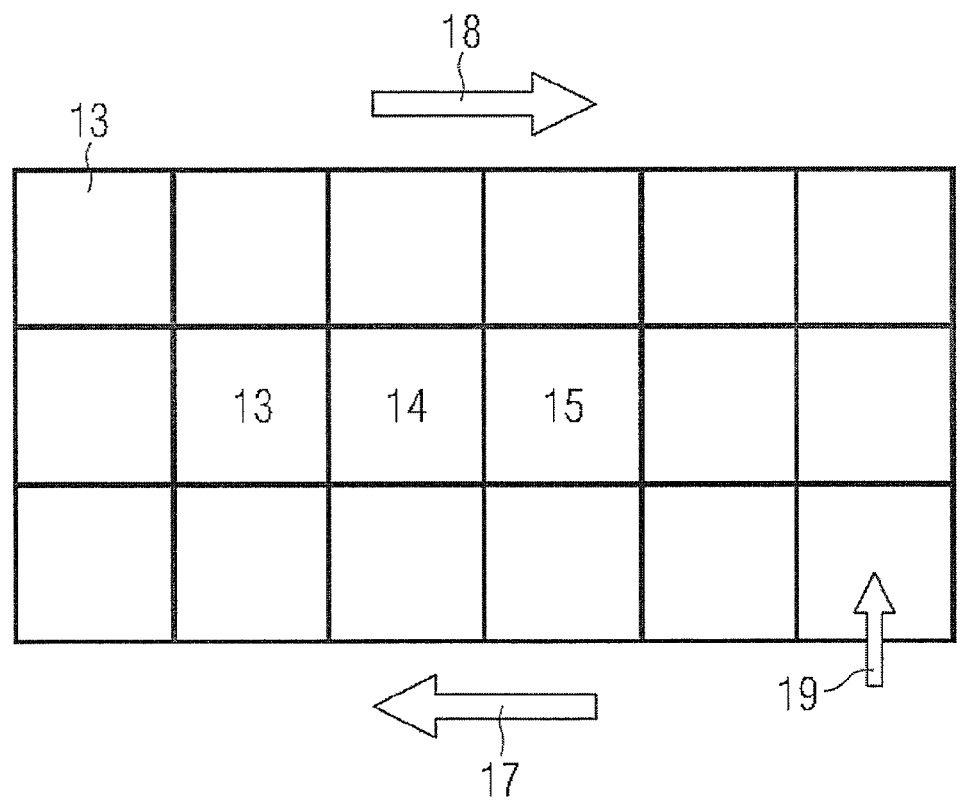
FIG. 2 shows a detector module of a device.

FIG. 2 shows a single detector module of a detector. The individual pixels 16 are preferably disposed in a rectangular matrix. For TDI the image information from individual columns 19 is always shifted in the TDI integration direction. The shift in direction of integration is preferably controlled by a clock which is synchronous with movement of the detector and therewith also of the detector module in the movement direction 17.

The movement 17 of the detector to the left relative to an object not shown here, which corresponds to a movement of the object to the right relative to the detector, is compensated electronically by a shift 18 of the pixel column 19 to the right. In this, each pixel 16 gives up its actual pixel value (i.e. intensity, or number of photons, or also charge or voltage) to the respective right-hand side neighbor, and simultaneously takes over its new value from the left-hand side neighbor. Thus, the pixel 14 gives up its pixel value to pixel 15 and then takes over the pixel value from pixel 13. Thus, with a corresponding temporal synchronization of the shift with the movement of the object or the detector, an exposure system results which is virtually of fixed location.

The efficiency of TDI is dependent upon the temporal and also local homogeneity of the relative movement of the detector and the recorded object. If this velocity fluctuates with respect to one of these dimensions, blurring artifacts occur in accordance with the magnitude of the discrepancy.

A disadvantage of TDI according to prior art is the loss of a certain number of intensity or count events in the detector pixels. If for example during a recording 5 pixels are shifted to the right row by row, then 5 values become lost on the right-hand outer edge, whilst on the left-hand edge 5 values are obtained which have an intensity or counts reduced stepwise from right to left.

Figure 3:
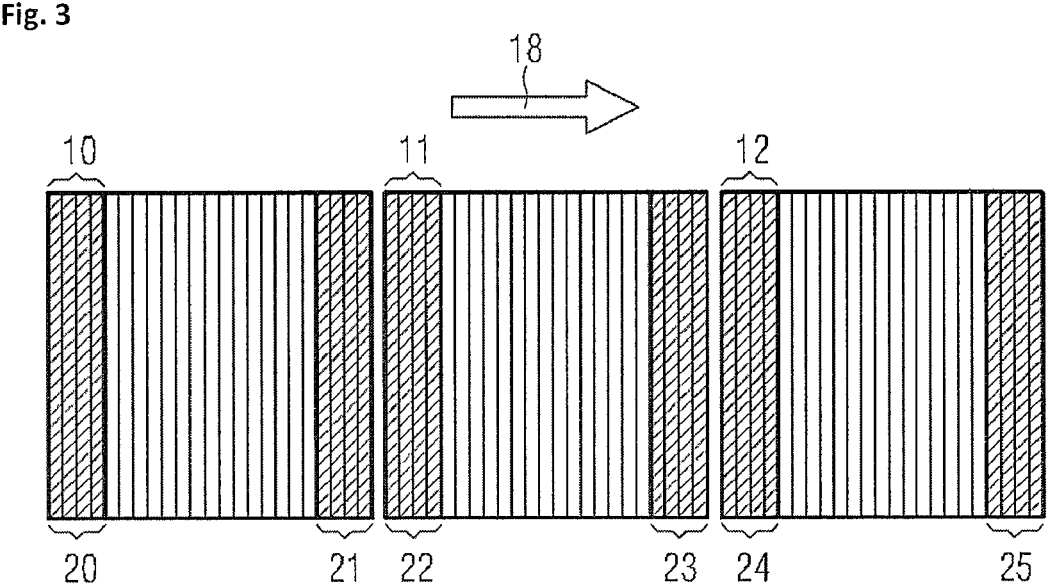
FIG. 3 shows a plan view of a plurality of adjacently disposed detector modules.

FIG. 3 shows individual, adjacently disposed detector modules 10, 11 and 12. Here the individual columns 19 are illustrated. In accordance with an embodiment, the detector modules are disposed to overlap, as illustrated in the subsequent Figures. For the sake of clarity of illustration they are shown in this Figure adjacently in a plan view, without overlapping. The overlapping regions 20, 21, 22, 23, 24 and 25 each include a given number of columns.

Figure 4:
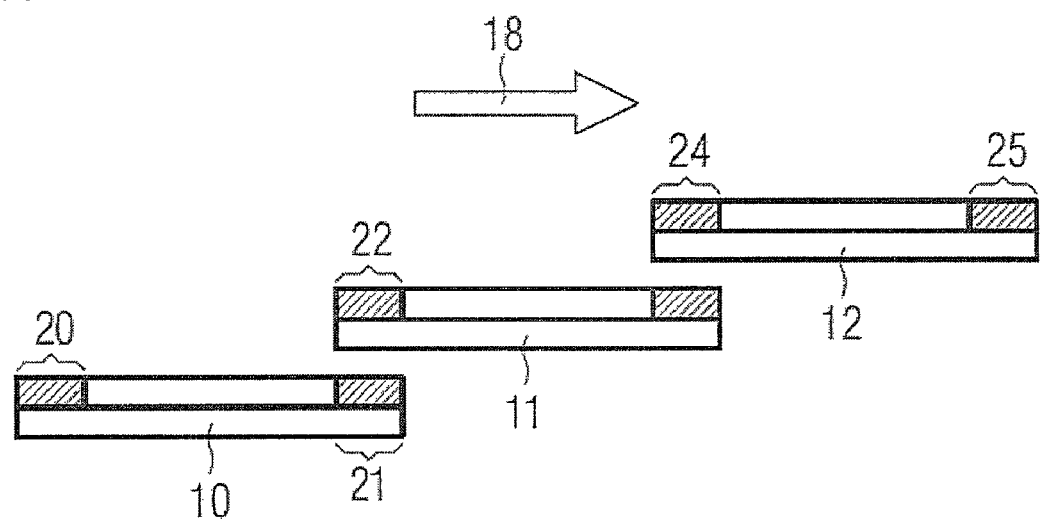
FIG. 4 shows a plurality of detector modules disposed to overlap.

FIG. 4 shows an arrangement having detector modules 10, 11 and 12 disposed to overlap. In this, the overlapping regions 21 and 22, and also 23 and 24 each lie exactly above each other.

Figure 5:
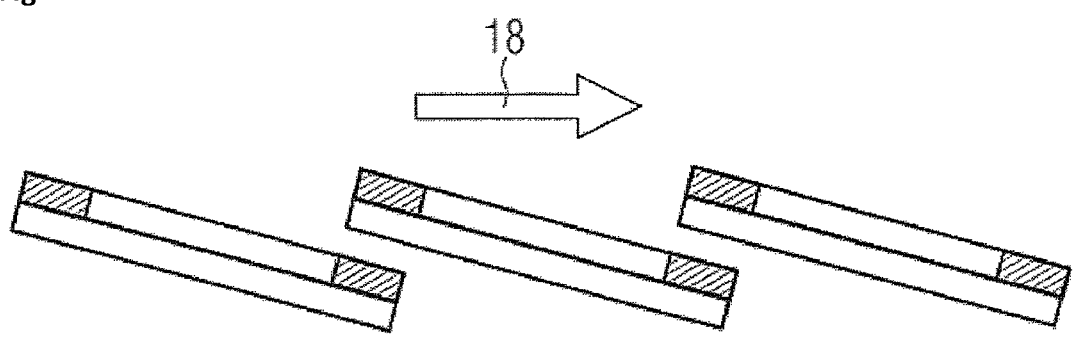
FIG. 5 shows a plurality of obliquely disposed, overlapping detector modules.
Figure 6A:
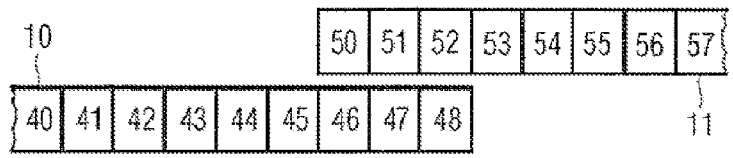
FIG. 6 shows a time sequence of TDI.
Figure 6B:
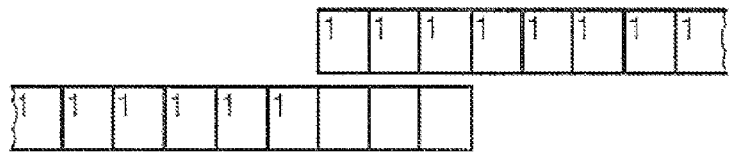
Figure 6C:
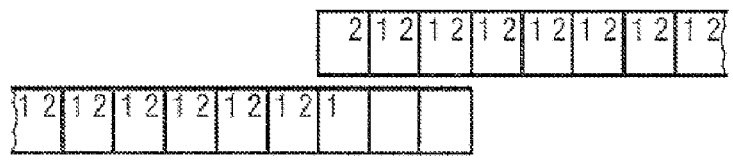
Figure 6D:
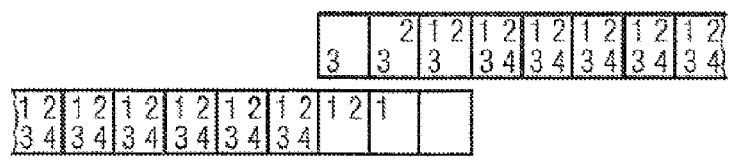
Figure 6E:
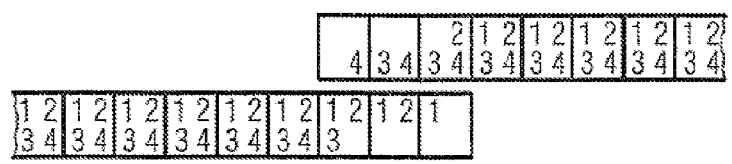
Figure 6F:
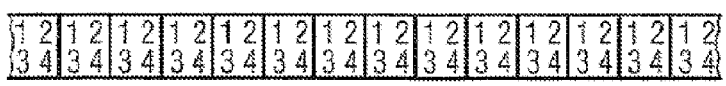

FIG. 5 illustrates a slightly obliquely positioned detector arrangement with overlapping individual detector modules. Here the end of a detector module lies below the beginning of the next detector module, as seen along a direction of shift corresponding to the direction of integration.

FIG. 6 shows the operating sequence of a TDI in a detector arrangement. The illustration 6a depicts a first detector module 10 with individual detector columns 40 to 48, and also a second detector module 11 with detector columns 50 to 57. In each case three detector columns overlap. Thus, the detector columns 50 to 52 lie above the detector columns 46 to 48. The illustration 6b shows the state following a first integration interval. The detector columns 40 to 45 and also 50 to 57 contain the corresponding radiation values of the first integration interval. The detector columns 46 to 48 have not yet received any signal, as they lie below the detector columns 50 to 52 of the second detector module 11 and are screened-off by these. In order to improve this effect, additional screening can be provided between these detector columns. The state following a second integration time interval is shown by the illustration 6c. At the beginning of the second integration interval the individual values of the detector columns are shifted along the integration direction 18, i.e. to the right-hand side. Thus, the preceding values from the detector columns 40 to 45 are now in the columns 41 to 46. A further value 1 is transferred from a not shown detector column disposed further to the left of the detector column 40 into the detector column 40. The values of the detector columns 50 to 56 are now transferred into the detector columns 51 to 57. The value of the detector column 57 is transferred into a not shown detector column disposed further to the right of this. Following this transfer, the signal in the second integration time interval is integrated. Thus now, the detector modules 40 to 45 and 50 to 57 once again receive the instant signal of the second integration interval. The illustration 6d depicts the individual detector columns at the end of the third integration interval. In the same way as described above, at the beginning of the third integration interval a shift to the right was performed, and thereafter the measurement values 3 were integrated for the duration of the integration interval. In the illustration 6e the state following the fourth integration interval is also depicted. Now in FIG. 6f the result of a TDI is depicted. Thus, the signal of all detectors at a certain position are added. The columns 40 to 45 of the first detector module, which each contain all values of the integration intervals one to four, are directly taken over. In the overlap region the values of the detector columns 46 and 50, 47 and 51, 48 and 52 are each added together. As can be discerned, these columns thus contain also the complete set of the integration values of the intervals 1 to 4. The columns 53 to 57 are again taken over without addition, as here no further available detector columns are disposed in parallel. Thus, the addition is effected exclusively in the overlap region.

Figure 7:
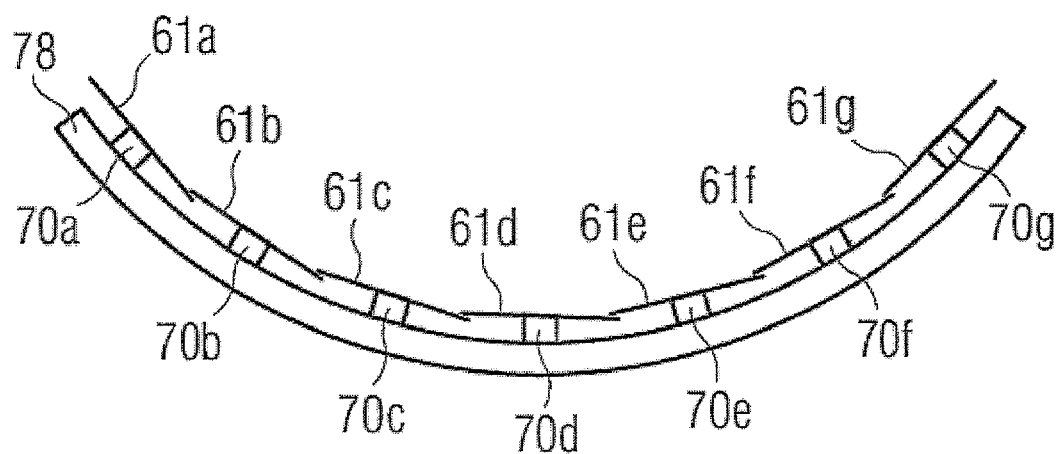
FIG. 7 shows a plan view of a composite round detector.

FIG. 7 shows a plan view of a round detector 60 which is composed of a plurality of detector modules. This detector has a detector support 78 on which a multitude of plane detector modules 61a to 61g are mounted. These detector modules each include at least one high-resolution semiconductor-X-ray detector. The detector support 78 determines the arched basic shape of the detector. Preferably the detector modules overlap slightly, so that the connecting regions at the edge of a detector module lie below the neighboring detector module. With this, an imaging without gaps is possible. The individual detector modules 61a to 61g are fastened to the detector support 78 with detector holders 70a to 70g. The detector holders are preferably adapted to be adjustable. With these detector holders a simple adjustment of the arrangement can be effected.

Figure 8:
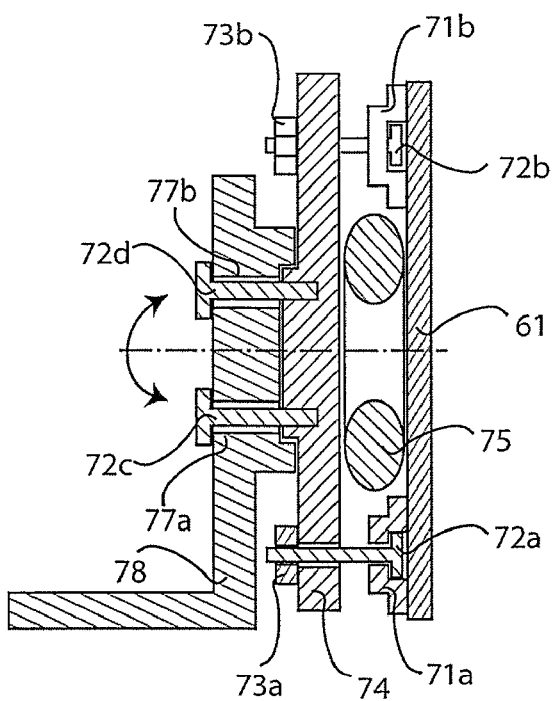
FIG. 8 shows a cross-section of a detector support.

FIG. 8 shows a cross-section through a detector holder 70. The detector holder connects a detector module 61 to the detector support 78. For this a clamping plate 74 is fastened to the detector support 78 by means of bolts 72. Owing to the oblong holes 77, this clamping plate can be rotated slightly with respect to the detector support. A rubber ring 75, preferably an O-ring, is inserted between the detector module and the clamping plate. The detector module 61 is clamped against the elastic rubber ring by means of further bolts fastened to the detector model through a holding bracket 71, and nuts 73. Preferably three nuts are used here, so that the detector module 61 can be aligned along all directions. Following its assembly, the detector holder can be fixed, for example with an adhesive. Here it is especially preferred to introduce a two-component adhesive into the detector holder.

Figure 9:
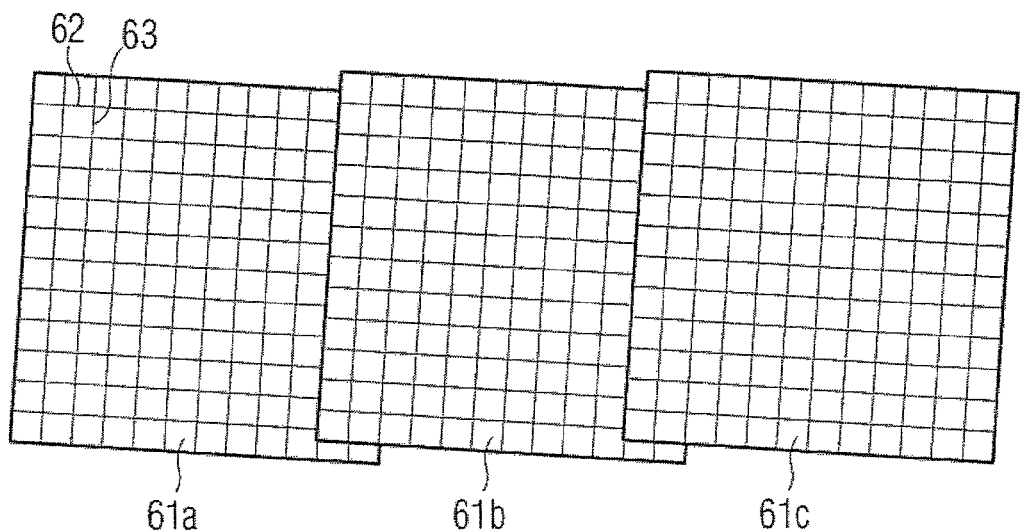
FIG. 9 shows a plan view of detector modules.

FIG. 9 shows a plan view of the detector module 61 of the round detector 60. In this illustration each of the detector modules has horizontally extending detector rows 62 and vertically extending detector columns 63 of individual detector modules. The size of a detector module of this kind is typically in a range of 10 micrometers to 500 micrometers, and preferably 100 micrometers. As the individual detector modules have fabrication tolerances, they must be aligned or positioned individually. Furthermore, the detector modules must overlap slightly.

Figure 10:
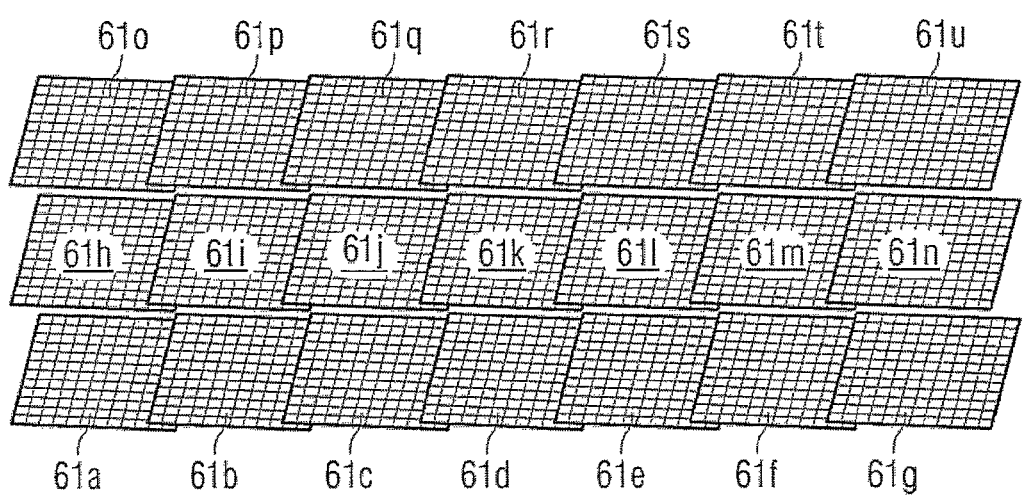
FIG. 10 shows a view of a round detector having a plurality of detector rows.

FIG. 10 shows a view of another round detector 60 as seen from an X-ray tube 15. With this, three rows of detector modules are provided above each other. The upper row with the detector modules 61o to 61u is tilted with respect to the middle row with the detector modules 61h to 61n. The same applies to the lower row with the detector modules 61a to 61g. Owing to the tilted upper and lower row, an approximation to an arched constructional configuration results.

Figure 11:
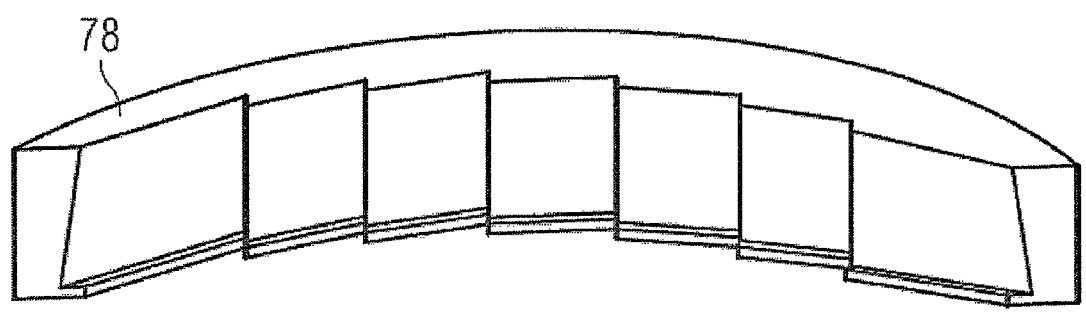
FIG. 11 shows a one-piece detector support.

FIG. 11 shows a detector support, made for example of aluminum. This support has accommodating faces for fastening the individual detector modules.

DETAILED DESCRIPTION OF PREFERRED EMBODIMENTS

For reconstructing a tomographic image in a computer-tomographic image-forming system, projection image recordings are made from various directions with the aid of an X-ray source and a suitable detector. For complete reconstruction, each volume element (voxel) to be imaged must have been recorded in projection within an angular region of at least 180°.

An object of which an image is to be recorded, which is usually a patient, is usually held in a fixed position, while an X-ray source and a detector which are connected to each other along a rigid axis move along a circle around the object. During this, projection images are continuously recorded using a fan-shaped or cone-shaped X-ray beam.

Depending upon rotational speed, exposure time, and image readout rate of the detector, raw data images are accompanied by correspondingly high blurring owing to movement. Specifically with time-critical recordings in which a tolerable duration of a scanning operation is limited, high rotational speeds are achieved. In order to compensate these, the detector must make available an image rate appropriate to its resolution. Furthermore, it is possible to maintain the focal point of the X-ray radiation in a fixed location during a single recording (so-called spring focus, also known as spring focus alpha, or Z-flying focal spot), whereby blurring on the detector is reduced because of the moving recording geometry.

Another reduction of blurring can be achieved by what is known as time-delayed integration. This is preferably combined with the above-described spring focus. It is of particular advantage to implement this time-delayed integration on the recording chip (On-Chip TDI). For this, the image information or charges of individual pixel rows are shifted synchronously with the movement in the recording chip. Large active detector faces often require a combination of a plurality of single elements (tiles) to form a tiled arrangement. A disadvantage of composite detectors is the size of the individual detector modules, which size is actually still limited by the used material. Because of this, gaps can arise in dependence upon fabrication, and require an interpolation between projection images.

For technical reasons, with composite detectors an on-chip TDI is difficult to achieve beyond the limits of a detector module (detector chips), because for this the individual detector modules still require to be connected at their edges. This would have the result, amongst other, of a widening of the gaps between the detector modules and therewith of an enlarging of the regions to be interpolated in the projection images.

The gaps between the individual detector modules are eliminated by disposing the individual detector modules to overlap. Preferably an overlapping is chosen which corresponds to a desired TDI shift per recording. Preferably this overlapping is effected along the entire length of the detector and uniformly on the same side of each detector module. For this it is of particular advantage when the detector modules are disposed to be slightly oblique. With this, the overlapping can be effected in a horizontal direction as well as in a vertical direction. The direction in which the pixel values are shifted during a TDI operation should preferably agree with the direction of overlapping. A vertical overlapping would therefore involve also TDI in a vertical direction. Owing to the overlapping a buffer is created which can store intermediately the pixel values which would otherwise be lost at the edge. As soon as a pixel value has here reached the beginning of the buffer region, it will lie in the X-ray shadow and will be protected from further X-ray quanta by an intervening detector module and any additional screening. After a recording has been made, the buffer also is read-out. The values stored therein are then added in a subsequent processing step to the corresponding pixel columns of an adjoining detector module.

With a constant detector speed this method therefore permits utilization of the full functional range of a time-delayed integration even with modularly built-up composite detectors, without any individual detector modules having to be electrically connected for an exchange of pixel values. This makes possible a distinctly better resolution than would be possible without TDI, or only with TDI limited to detector modules.

In another embodiment, the detector for a computer tomograph is designed to be arched, so that a central ray of a beam of rays from the X-ray tube, and also other rays traveling laterally of, above, or below this, will be incident perpendicularly on the surface of the detector.

It is of particular advantage for individual detector modules to overlap in a manner of roof tiles. The arched shape of a detector support 78 is configured so that the detector modules fastened thereon are arched with a radius corresponding to the distance of the detector from the X-ray tube. An X-ray detector of this kind can be utilized also in an X-ray scanner.

Another embodiment is an X-ray scanner, in particular a computer tomograph having a detector as described in this document.

Another embodiment relates to a method for performing a time-delayed integration with a detector composed of a plurality of detector modules, in which the individual detector modules are disposed so that they overlap. For evaluation, here an addition of detected values from the overlapping regions is performed. An It will be appreciated to those skilled in the art having the benefit of this disclosure that this invention is believed to provide X-ray detectors used for. X-ray scanners. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. X-ray detector for recording an image of an object moving relative to the detector, comprising at least a first and second detector module for detecting individual pixel values, the detector modules being adapted to perform a TDI (Time Delayed Integration) for which they shift pixel values along a direction of movement of the object in correspondence with a movement of the object with respect to the detector, wherein the direction of movement being from the first detector module to the second detector module; and wherein the detector modules are disposed adjacently so that they partially overlap to form an overlap region; the second detector module being over the first detector module, the first detector module being screened in the overlap region;

wherein an evaluation unit is coupled to the detector modules for determining corrected pixel values in the overlap region from pixel values of the detector modules, by adding the pixel values in the overlap region.

2. X-ray detector according to claim 1, wherein for performing a TDI, detector columns comprising a plurality of pixels are shifted within a detector module, with no shift being effected from one detector module into another detector module.

3. X-ray detector according to claim 1, wherein the evaluation unit performs an addition of pixel values of overlapping detector modules in the overlap region, and individual pixel values are scaled prior to the addition.

4. X-ray detector according to claim 1, wherein the X-ray detector is of an arched shape.

5. X-ray detector according to claim 1, wherein an overlapping of the detector modules is effected so that along a direction of shift an end of a detector module lies below a beginning of a next detector module.

6. X-ray detector according to claim 5, wherein the X-ray detector is a tiled round detector comprising an arched detector support on which detector modules are mounted by means of detector holders.

7. X-ray scanner comprising an X-ray detector according to claim 1.

8. Method for operating an X-ray detector comprising at least two adjacently disposed, partially overlapping detector modules for recording an image of an object that is moving relative to the detector, the method comprising:
   a) performing a TDI (Time Delayed Integration) with a given number of integration steps;
   b) determining pixel values of a region of overlapping by weighted addition of pixel values of the region of overlapping of the partially overlapping detector modules.

* * * * *